US011218458B2

(12) United States Patent
Duncan et al.

(10) Patent No.: US 11,218,458 B2
(45) Date of Patent: *Jan. 4, 2022

(54) MODULAR DATA CENTER THAT TRANSFERS WORKLOAD TO MITIGATE A DETECTED PHYSICAL THREAT

(71) Applicant: DELL PRODUCTS, L.P., Round Rock, TX (US)

(72) Inventors: Tyler B. Duncan, Austin, TX (US); Mukund P. Khatri, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/653,941

(22) Filed: Oct. 15, 2019

(65) Prior Publication Data

US 2021/0112043 A1    Apr. 15, 2021

(51) Int. Cl.
*H04L 9/32* (2006.01)
*H04L 29/06* (2006.01)
*H05K 7/14* (2006.01)
*H04L 29/08* (2006.01)
*H04L 9/08* (2006.01)
*H04W 12/08* (2021.01)

(52) U.S. Cl.
CPC .......... *H04L 63/0492* (2013.01); *H04L 9/083* (2013.01); *H04L 67/24* (2013.01); *H04W 12/08* (2013.01); *H05K 7/1492* (2013.01); *H05K 7/1495* (2013.01)

(58) Field of Classification Search
CPC ..... H04L 63/0492; H04L 67/24; H04L 9/083; H05K 7/1495; H05K 7/1492; H04W 12/08
See application file for complete search history.

(56) References Cited

U.S. PATENT DOCUMENTS

| 6,496,949 | B1 * | 12/2002 | Kanevsky | G06F 11/1456 340/3.3 |
| 7,861,111 | B2 | 12/2010 | Doerr | |
| 8,707,095 | B2 | 4/2014 | Grimshaw | |
| 9,983,951 | B2 | 5/2018 | Lad et al. | |
| 2008/0294287 | A1 * | 11/2008 | Kawano | G05B 19/4189 700/252 |
| 2010/0107241 | A1 * | 4/2010 | Jaber | G06F 21/31 726/18 |
| 2010/0223669 | A1 | 9/2010 | Vermeulen et al. | |

(Continued)

*Primary Examiner* — Phy Anh T Vu
(74) *Attorney, Agent, or Firm* — Isidore PLLC

(57) ABSTRACT

A modular data center (MDC) includes an in-band communication network connection communicatively coupled between an information technology (IT) component of the MDC and a data center external to the MDC. A sensor of a security system of the MDC detects a presence of a person in proximity to an exterior of the MDC or inside of the MDC. In response to determining that the person is detected, a controller of the MDC determines whether the detected person is authenticated. In response to determining that the detected person is not authenticated, the controller authenticates the data center via the in-band communication network connection, and the controller transfers computing workload and data from the at least one IT component to the data center via the in-band communication network connection.

20 Claims, 9 Drawing Sheets

(56) References Cited

U.S. PATENT DOCUMENTS

| | | | |
|---|---|---|---|
| 2012/0200987 A1* | 8/2012 | Schmitt | H05K 7/1492 |
| | | | 361/624 |
| 2016/0380843 A1* | 12/2016 | Duncan | G06F 3/04842 |
| | | | 715/736 |
| 2018/0308302 A1* | 10/2018 | Al-Yousef | H04L 63/10 |

* cited by examiner

MODULAR DATA CENTER THAT TRANSFERS WORKLOAD TO MITIGATE A DETECTED PHYSICAL THREAT

BACKGROUND

1. Technical Field

The present disclosure relates in general to a security system of a modular data center (MDC), and more particularly to a security system that secures workload and data handled by information technology (IT) components of an MDC.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A data center houses IHSs and associated components, such as telecommunications and storage systems. A modular data center (MDC) is a deployable data center. An MDC can be placed anywhere data capacity is needed. MDC systems consist of purpose-engineered modules and components that offer scalable data center capacity with multiple power and cooling options. Modular edge data centers (MEDCs) are generally smaller MDC facilities that extend the edge of the network to deliver cloud computing resources and cached streaming content to local end users. MEDCs that have only one or two racks for IT are also referred to as micro MDCs. Many MEDCs are deployed as a single volumetric container that is installed in a remote location, such as north of the Arctic Circle. At these remote locations, a malicious intruder to the MEDC, even if detected, would have time to gain physical access to IHSs within the MEDC before any human intervention response could occur. More than the potential loss of the value of hardware, the intrusion jeopardizes time sensitive workloads handled by the compromised MEDC, compromises other IHSs that are network-connected to the compromised MEDC, and places sensitive enterprise data contained in the MEDC at risk.

BRIEF SUMMARY

In accordance with the teachings of the present disclosure, a modular data center (MDC) includes a volumetric container having an interior enclosure. At least one information technology (IT) component is positioned within the interior enclosure of the volumetric container. The at least one IT component includes an in-band communication network connection communicatively coupled between the at least one IT component and a data center external to the MDC. A security system includes one or more sensors that detect a presence of a person in at least one of: (i) proximity to an exterior of the volumetric container; and (ii) an interior enclosure of the volumetric container. The security system includes a personnel authentication device that receives authentication credentials to verify authorized personnel. The security system includes a controller that is communicatively coupled to the at least one IT component, the in-band communication network connection, the one or more sensors, and the personnel authentication device. The controller executes a security platform application that enables the MDC to secure the at least one IT component. The controller determines, based on the one or more sensors, whether the presence of a person is detected. In response to determining that the presence of a person is detected, the controller determines, based on data received from the personnel authentication device, whether the detected person is authenticated. In response to determining that the detected person is not authenticated, the controller authenticates the data center via the in-band communication network connection. The controller transfers computing workload and data from the at least one IT component to the data center via the in-band communication network connection.

In accordance with another aspect of the present disclosure, an MDC security system includes one or more sensors that detect a presence of a person in at least one of: (i) proximity to an exterior of a volumetric container of an MDC; and (ii) an interior enclosure of the volumetric container of the MDC. The MDC includes at least one IT component positioned within the interior enclosure of the volumetric container. The MDC includes an in-band communication network connection communicatively coupled between the at least one IT component and a data center external to the MDC. A personnel authentication device receives authentication credentials to verify authorized personnel. A controller is communicatively coupled to the at least one IT component, the in-band communication network connection, the one or more sensors, and the personnel authentication device. The controller executes a security platform application that enables the MDC to secure the workload and the data in the event of detection of an unauthorized person in proximity to or inside of the MDC. The controller determines, based on the one or more sensors, whether the presence of a person is detected. In response to determining that the presence of a person is detected, the controller determines, based on data received from the personnel authentication device, whether the detected person is authenticated. In response to determining that the detected person is not authenticated, the controller authenticates the data center via the in-band communication network connection. The controller transfers computing workload and data from the at least one IT component to the data center via the in-band communication network connection to prevent local access to or tampering of the workload and data by the detected unauthorized person.

In accordance with the teachings of the present disclosure, a method is disclosed for autonomously securing workload and data handled by an MDC from a detected unauthorized/unauthenticated person. The method includes monitoring one or more sensors that detect a presence of a person in at least one of: (i) proximity to an exterior of a volumetric container of an MDC; and (ii) an interior enclosure of the volumetric container. The MDC includes at least one IT component positioned within the volumetric container. The MDC includes an in-band communication network connection communicatively coupled between the at least one IT component and a data center external to the MDC. The method includes determining, based on the one or more sensors, whether the presence of a person is detected. In response to determining that the presence of a person is detected, the method includes determining, based on data received from a personnel authentication device that receives authentication credentials to verify authorized personnel, whether the detected person is authenticated. In response to determining that the detected person is not authenticated, the method includes authenticating the data center via the in-band communication network connection. The method includes transferring computing workload and data from the at least one IT component to the data center via the in-band communication network connection.

The above presents a general summary of several aspects of the disclosure to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
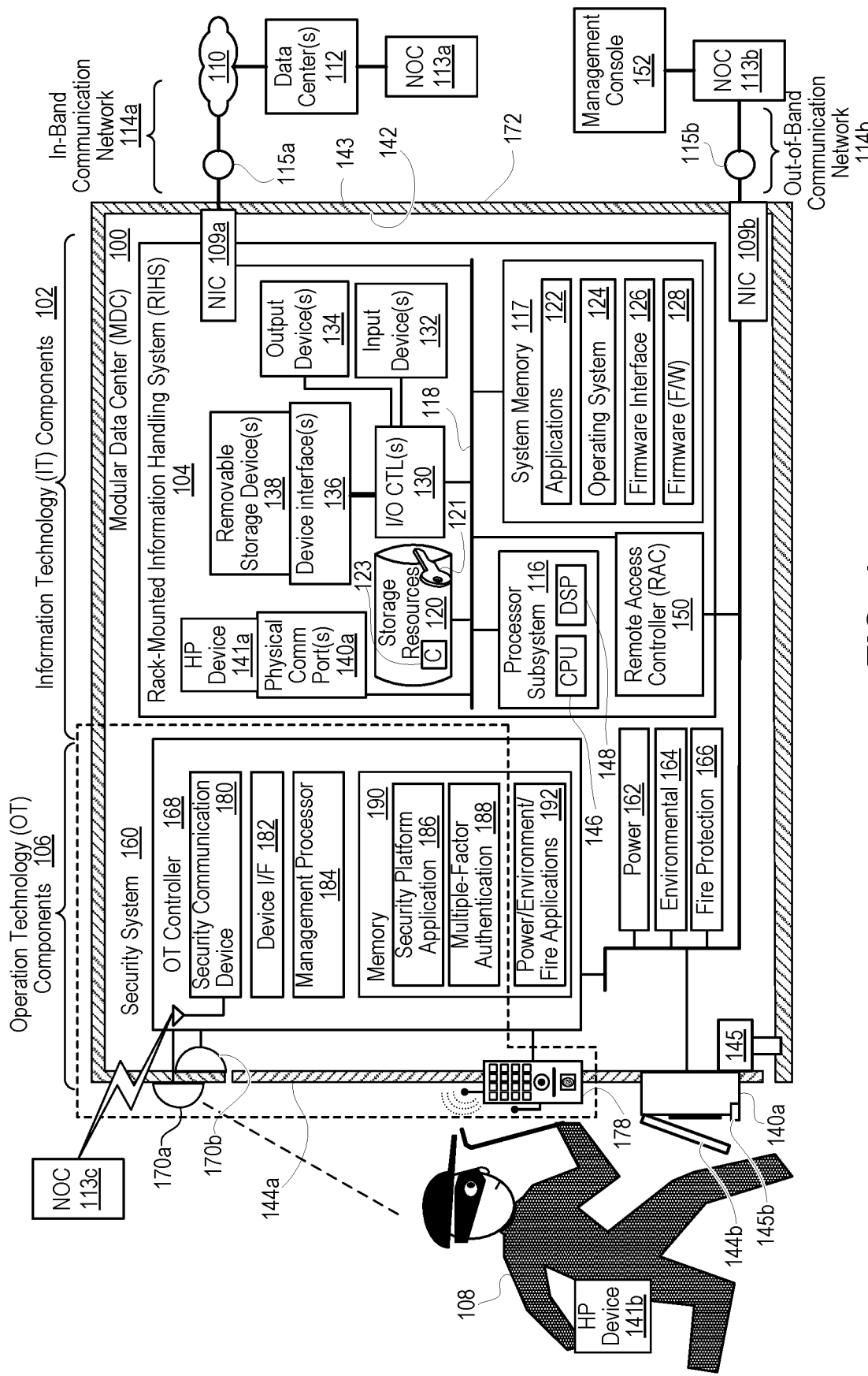
FIG. 1 is a block diagram of a modular data center (MDC) that autonomously secures an MDC from an unauthorized and/or unauthenticated person, according to one or more embodiments.

According to aspects of the present disclosure, a modular data center (MDC), an MDC security system, and a method are provided that autonomously secure workload and data handled by an information technology (IT) component(s) of an MDC from an unauthorized or unauthenticated person. A controller of a security system monitors one or more sensor(s) that detect a presence of a person in proximity to an exterior of a volumetric container of the MDC. In response to determining that the presence of a person is detected, the controller determines, based on data received from a personnel authentication device, whether the detected person is authenticated. In response to the person not being authenticated, the security system authenticates a data center remote to the MDC. For example, the data center can be another MDC that may have not been compromised and/or may not have otherwise been in active communication with the MDC. The MDC authenticates to confirm that the data center can be entrusted with the workload and data handled by the IT component(s) of the MDC. The MDC transfers computing workload and data from the IT component(s) to the data center via the in-band communication network connection.

The security system determines whether a person is not authenticated ("un-authenticated") and thus poses a potential threat. As used herein, un-authenticated encompasses at least several scenarios for finding that a person should not be at the MDC. First, the person refuses to present, or is incapable of presenting, physical authentication credentials. Second, authentication credentials are presented, such as an access card or biometric data that identifies the person, but identity is not cleared to enter the MDC and thus lacks authority (un-authorized). For example, to avoid disruptions of the MDC, personnel have to be individually authorized or arrive within a predefined schedule in order to be deemed authorized.

A cloud-based data center provides a cloud service to multiple customers that can flexibly be assigned virtual resources. The hardware that is assigned to support the cloud-based data center is trusted and can be readily reassigned. In one or more embodiments, MDC operates in a data center environment in which other MDCs are dedicated to servicing a particular location, such as another modular edge data center (MEDC). Workload is not routinely shifted within the enterprise as in the typical cloud-based data center. When a malfunction or physical threat warrants, the MDC can avail itself of another data center such as another MEDC that has excess capacity. However, the other MEDC needs to be authenticated, and in one or more embodiments, multi-factor authenticated. The MDC needs to confirm that this other data center such as the other MEDC is not compromised and is authorized to handle workload and data for a particular one or more customers. The multiple factor authentication can include confirming address, identifiers and encryption keys. For example, a third-party such as trusted management console can coordinate between the two MDCs so that appropriate credentials can be exchanged. In one or more embodiments, an MDC is provisioned with a list of one or more data centers to contact for transferring workload and data. In one or more embodiments, an MDC requests identity of a data center when needed from a network operations center (NOC). In one or more embodiments, an MDC performs ad hoc discovery of an available data center that is connected to the in-band communication network.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 is a simplified functional block diagram of modular data center (MDC) 100 having IT components 102 such as rack information handling systems (RIHSs) 104 that receive infrastructure support by operation technology (OT) components 106, including security from external threats such as unauthorized and/or unauthenticated person 108. Within the general context of IHSs, RIHS 104 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, RIHS 104 may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. RIHS 104 may also include one or more buses operable to transmit communications between the various hardware components. In one or more embodiments, RIHS 104 is rack-mounted to provide computing, communication and storage functionality in MDC 100.

RIHS 104 includes a network interface, depicted as network interface controller (NIC) 109a, in communication via network 110 for communicating with data center(s) 112. Management of data center(s) 112 is provided by network operations center (NOC) 113a. NIC 109a enables RIHS 104 and/or components within RIHS 104 to communicate and/or interface with other devices, services, and components that are located external to RIHS 104. These devices, services, and components can interface with RIHS 104 via an external network, such as network 110, using one or more communication protocols that include transport control protocol (TCP/IP) and network block device (NBD) protocol. Network 110 can be a local area network, wide area network, personal area network, and the like, and the connection to and/or between network 110 and RIHS 104 can be wired, wireless, or a combination thereof. For purposes of discussion, network 110 is indicated as a single collective component for simplicity. However, it should be appreciated that network 110 can comprise one or more direct connections to other devices as well as a more complex set of interconnections as can exist within a local area network or a wide area network, such as the Internet. In one or more embodiments, NIC 109a supports in-band communication network 114a via connection 115a that transfers workload and computer data between IT components 102 and data center(s) 112. In one or more embodiments, data center(s) 112 is cloud-based.

Processor subsystem 116 is coupled to system memory 117 via system interconnect 118. System interconnect 118 can be interchangeably referred to as a system bus, in one or more embodiments. System interconnect 118 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 118 can also be a Double Data Rate (DDR) memory interface. The system memory 117 can either be contained on separate, removable dual inline memory module (RDIMM) devices or system memory 117 can be contained within persistent memory devices (NVDIMMs). For example, the NVDIMM-N variety of NVDIMMs contain both random access memory, which can serve as system memory 117, and non-volatile memory. It should be noted that other channels of communication can be contained within system interconnect 118, including but not limited to i2c or system management bus (SMBus). System interconnect 118 communicatively couples various system components. Examples of system components include replaceable local storage resources 120 such as solid-state drives (SDDs) and hard disk drives (HDDs).

In a particular one or more embodiments, local storage resources 120 can include or comprise self-encrypting drives (SEDs) that protecting data from unauthorized access. SEDs use two sets of keys to protect the data from unauthorized access. One key is called the media encryption key (MEK). In the drive factory, each SED randomly generates an MEK that is encrypted and embedded within the drive. The MEK is never exposed outside the drive and requires no management by the user. The MEK functions as a secret password so that the encryption/decryption engine built into the drive will know how to decrypt the user data stored on the physical media. The encryption in the drive uses a symmetric key algorithm which means the MEK is the same for encrypting and decrypting the data on the disk. This MEK can be changed by cryptographic erase (CE), but the encryption can never be turned off. CE is a feature that permanently changes the MEK so the drive can be reused or repurposed. After the CE is performed, the data previously written to the drive becomes unreadable. CE is also known as secure erase or crypto-erase. The second required key is called the authority credential (AC), sometimes referred to as the locking key, credentials, authentication keys, or access key (AK). It is used to unlock and configure the SED. There is one AC for each SED. For example, DELL storage controller (SC) Series arrays automatically detect SED drives and will create the ACs when the array is initially configured with SEDs or when SEDs are added to a legacy system. The AC is stored in a KMIP secret data object on the KMS. There is one valid secret data object for each SED that has been put into a lockable state. An SC Series array completes a Key Management Interoperability Protocol (KMIP) register on this secret data object, and the secret data object "keyblock" contains the AC. The SC array also controls the contents of the secret data object.

Once an SED has been configured with an AC, the AC must be provided to unlock the drive, and the drive remains unlocked only while the device is powered on. The drive locks itself upon losing power or shutting down, and the AC must be provided again before the drive will unlock and participate in input/output (I/O) operations. The process of how data is accessed on an SED during normal operation includes: (i) Upon boot, storage controller operating system (SCOS) sends a series of commands to the drive to unlock the drive. One of those commands is an authentication request which carries the AC. (ii) The drive electronics hash the AC from the storage controller and pull the stored hashed access key from the drive storage. The hashed keys are compared. (iii) If the hashed keys do not match, no access is given to the data and a security error is passed back to the storage controller stating that the drive is locked and that the subsystem does not have authorization to access it. If the hashed keys match, a subsequent drive command is sent to unlock the drive. (iv) During a request for data, the encrypting/decrypting circuit pulls the requested data from the drive and uses the MEK to decrypt the encrypted user data. The decrypted user data is then passed back to the storage controller. The drive remains unlocked until the drive gets powered down. If removed, the drive becomes a locked drive in which security has been enabled and the drive has been unexpectedly removed from the storage array or powered down. Data on the drive cannot be read from or written to until the appropriate AC is provided. Thus, contents 123 of storage resources 120 can be selectively protected by locking keys 121 issued to storage resources 120 to make content 123 externally available without encryption. Deleting locking keys 121 does not preclude continued operation within MDC 100 but does protect the content 123 from exploitation if a particular storage resource 120 is removed from MDC 100.

Software and/or firmware modules and one or more sets of data that can be stored on local storage resources 120 and be utilized during operations of RIHS 104. Specifically, in one embodiment, system memory 117 can include therein a plurality of such modules, including one or more of application(s) 122, operating system (OS) 124, a firmware interface 126 such as basic input/output system (BIOS) or Uniform Extensible Firmware Interface (UEFI), and platform firmware (FW) 128. These software and/or firmware modules have varying functionality when their corresponding program code is executed by processor subsystem 116 or secondary processing devices within RIHS 104. For example, application(s) 122 may include a word processing application, a presentation application, and a management station application, among other applications.

RIHS 104 further includes one or more input/output (I/O) controllers 130 that support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with RIHS 104. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses. Physical communication port(s) 140a-b that are communicatively coupled to system interlink 118 enable coupling of other devices with/to RIHS 104. For example, external physical communication port 140b can be used to gain access to RIHS 104 without having to work inside of the close confines of interior enclosure 142 of volumetric container 143 of MDC 100. One or more doors 144a, physically secured by door lock(s) 145a, enable physical access to IT components 102 and OT components 106. In one or more embodiments, door lock(s) 145a include door open and/or door closed sensing. Hot pluggable device 141a is engaged to physical communication port 140a. HP device 141b is not yet engaged to either physical communication port 140a or external physical communication port 140b. External physical communication port 140b is accessible via small door 145b that is physically secured by small door lock 145b. In one or more embodiments, door lock 145b include door open and/or door closed sensing. Hot pluggable devices 141a, 141b are a selected one of: (i) a storage device containing at least one of: (a) computer program code; (b) computer data; and (c) digital media; and (ii) an encryption key device.

Processor subsystem 116 can include at least one central processing unit (CPU) 146 that is augmented by digital signal processor (DSP) 148. Processor subsystem 116 interfaces to functional components of the RIHS 104 such as a baseboard management controller (BMC). Remote access controller (RAC) 150 performs BMC functionality including monitoring the physical state of a computer, network server or other hardware devices of IT components 102 using sensors. RAC 150 also supports communicating with a system administrator through an independent connection, such as NIC 109b. As a non-limiting example, RAC 150 can be an improved integrated Dell Remote Access Controller (iDRAC) from Dell® that supports in part security operation functionality described herein. The iDRAC has the ability to edit/create files locally to itself. The iDRAC also has the ability to see OS specific files. RAC 150 performs out-of-band communication for the RIHS 104 via NIC 109b. In one or more embodiments, NIC 109a supports out-of-band communication network 114b via connection 115b to administrative or management console 152 at NOC 113b.

To manage operations of MDC 100, management console 152 transfers administrative data, administrative settings, and upgraded computer code via out-of-band communication network 114*b*. In one or more embodiments, OT components 106, under control of OT controller 168, provide infrastructure operational support to IT components 102 of MDC 100 including security system 160, power system 162, environmental system 164, and fire protection system 166.

Security system 160 in general protects MDC 100, and in particular, protects valuable enterprise workloads and data, from exterior threats such as by unauthorized person or a person with malicious intent. The person is classified as unauthorized if the person is unable to provide the correct authentication credentials within a time period following detection of the person by the sensors. For purposes of the disclosure, such a person is referred to as unauthenticated person 108, and it is appreciated that in some instances, the detected person can be "authorized", but does not possess the correct security credentials or cannot provide the credentials in the time allotted for entry of the security credential. Conversely, the person can be identifiable via correct security credentials but is not individually pre-authorized to be at MDC 100 or has arrived outside of an authorized schedule for personnel to access MDC 100. One or more sensors 170*a*, 170*b* of security system 160 detects a presence of a person in at least one of: (i) proximity to exterior 172 of enclosure 142; and (ii) interior enclosure 142 of volumetric container 143. Sensor 170*a* generally represents sensors located external to volumetric container 176, while sensor 170*b* generally represents sensors located external to volumetric container 176. Sensors 170*a*, 170*b* can include one or more of: (i) infrared sensor; (ii) optical sensor; (iii) range finding sensor; (iv) acoustic sensor; (v) pressure sensor; (vi) light curtain; (vii) motion sensor; and (viii) door sensor. These and other sensors perform the functions of: (i) infrared imaging; (ii) optical imaging; (iii) range finding; (iv) acoustic sensing; (v) pressure sensing; (vi) light curtain sensing; (vii) motion sensing; and (viii) door sensing. Personnel authentication device 178 of security system 160 receives authentication credentials to verify authorized personnel. Personnel authentication device 178 can support one or more authentication capabilities including: (i) biometric voice recognition; (ii) biometric facial recognition; (iii) biometric fingerprint recognition; (iv) biometric retina recognition; (v) manual, gesture or oral passcode verification; (vi) access card reading; and (vii) radio frequency identification (RFID) badge interrogation.

In one or more embodiments, OT controller 168 serves, at least in part, as controller for security system 160. OT controller 168 is an information handling system that can include some or all of the functional components of RIHS 104. In addition, OT controller 168 can include specialized capabilities including functions of security communication device 180, which provides dormant, undiscoverable communication channel to separate NOC 113*c*. In one or more embodiments, security communication device 180 is a wireless wide area network (WWAN) communication device, such as a cellular telephone that is configured to ignore incoming call/session requests to make less discoverable by third parties that intend to cut off MDC 100 from notifying help. OT controller 168 is communicatively coupled to sensors 170*a*, 170*b* and personnel authentication device 178 via device interface (I/F) 182. OT controller 168 has management processor 184 that executes security platform application 186 and multiple-factor authentication application 188 contained in memory 190. Multi-factor authentication is an authentication method in which a computer user or automated entity is granted access only after successfully presenting two or more pieces of evidence to an authentication mechanism. The two or more pieces of evidence can be based on knowledge, possession, and inherence. Memory 190 also includes power, environmental, and fire protection applications 192. OT controller 168 is communicatively coupled, either directly or indirectly, via in-band communication network 114*a* and out-of-band communication network 114*b* to secure IT components 102.

In one or more embodiments, security platform application 186 is configured to communicate with at least one of NOCs 113*a-c* following detection of an un-authorized/un-authenticated person. The at least one of NOCs 113*a-c* can notify support personnel to travel to MDC 100. Human or automated response systems at the at least one of NOCs 113*a-c* can analyze sensor data as a required first step before MDC 100 is instructed to implement or cancel an action to secure IT components 102. In an alternate embodiment, human or automated response systems at the at least one of NOCs 113*a-c* can analyze sensor data as a follow-on step after MDC 100 implemented an action to secure IT components 102.

Figure 2:
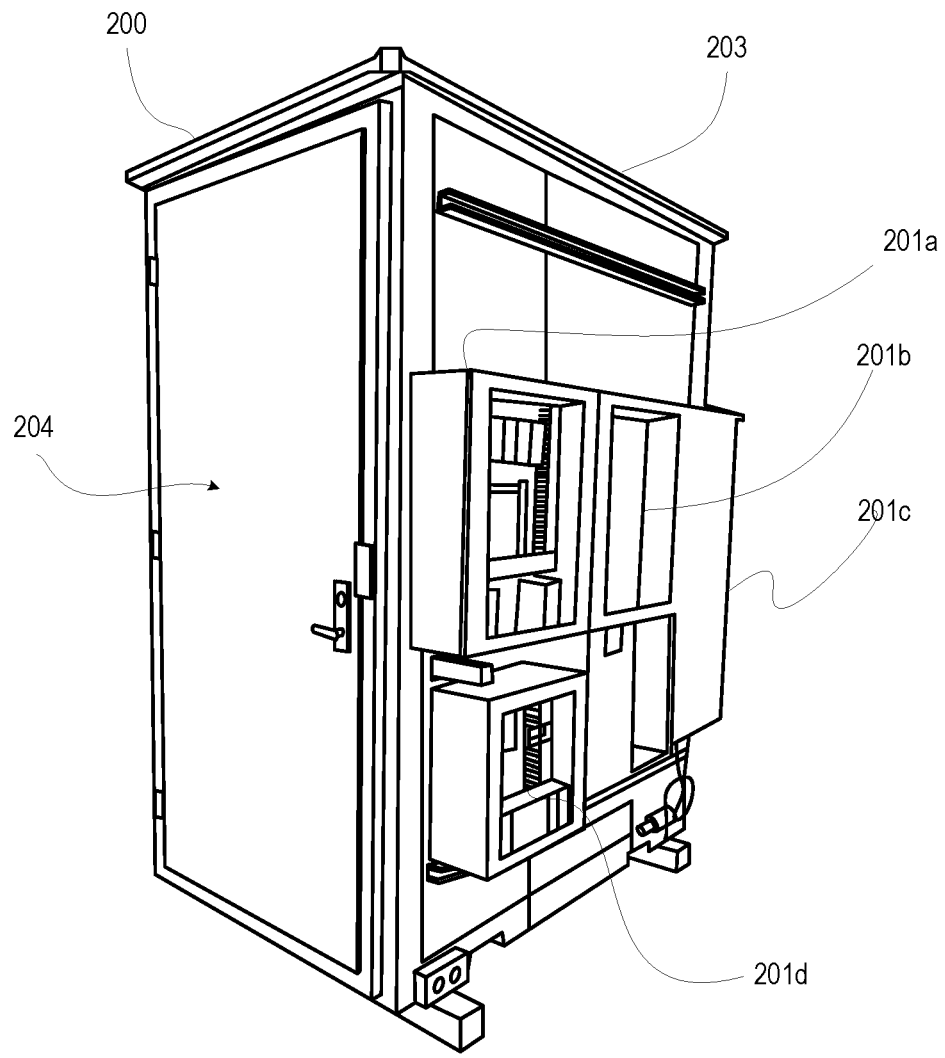
FIG. 2 is a side perspective view of an example MDC, according to one or more embodiments.
Figure 3:
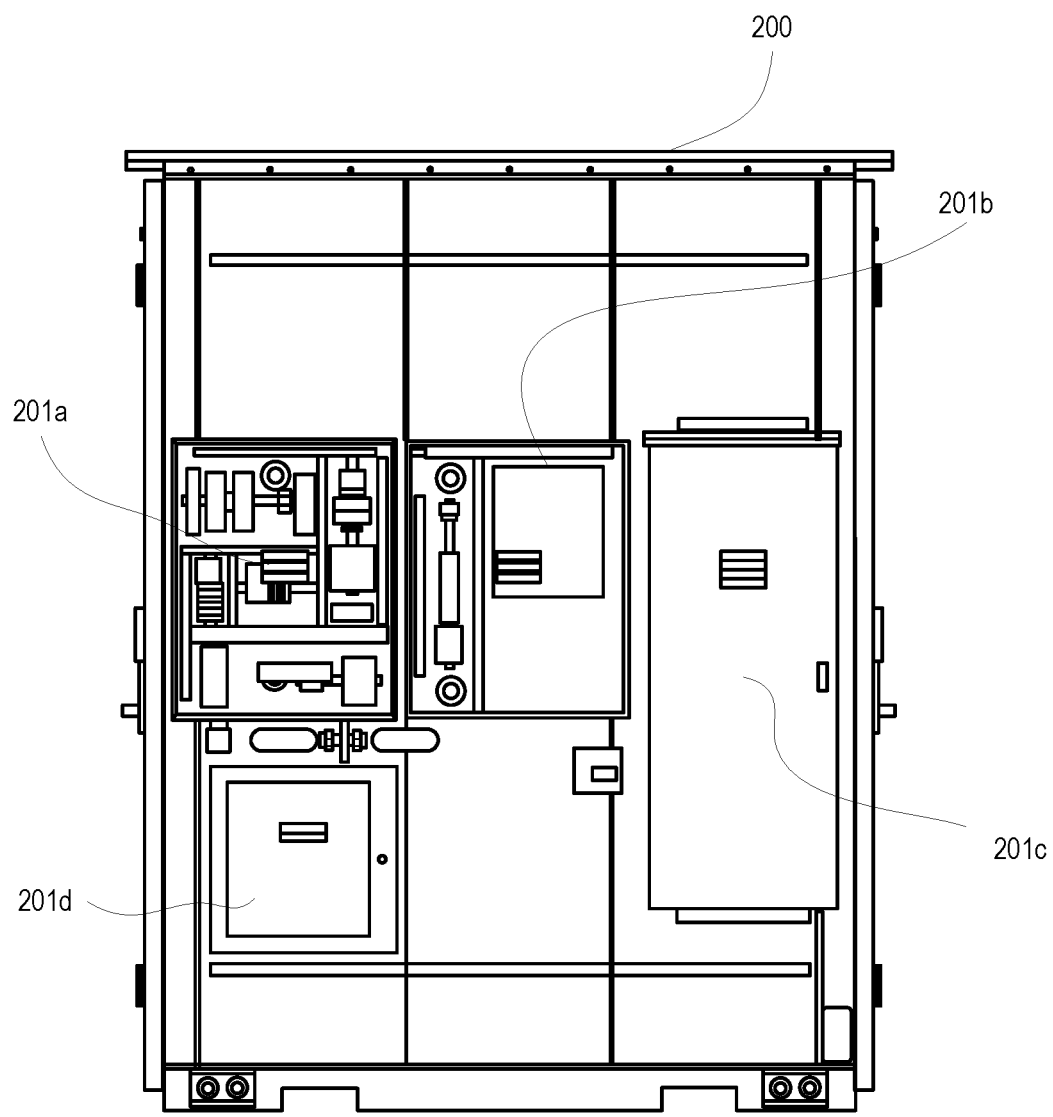
FIG. 3 is a front view of the example MDC, according to one or more embodiments.
Figure 4:
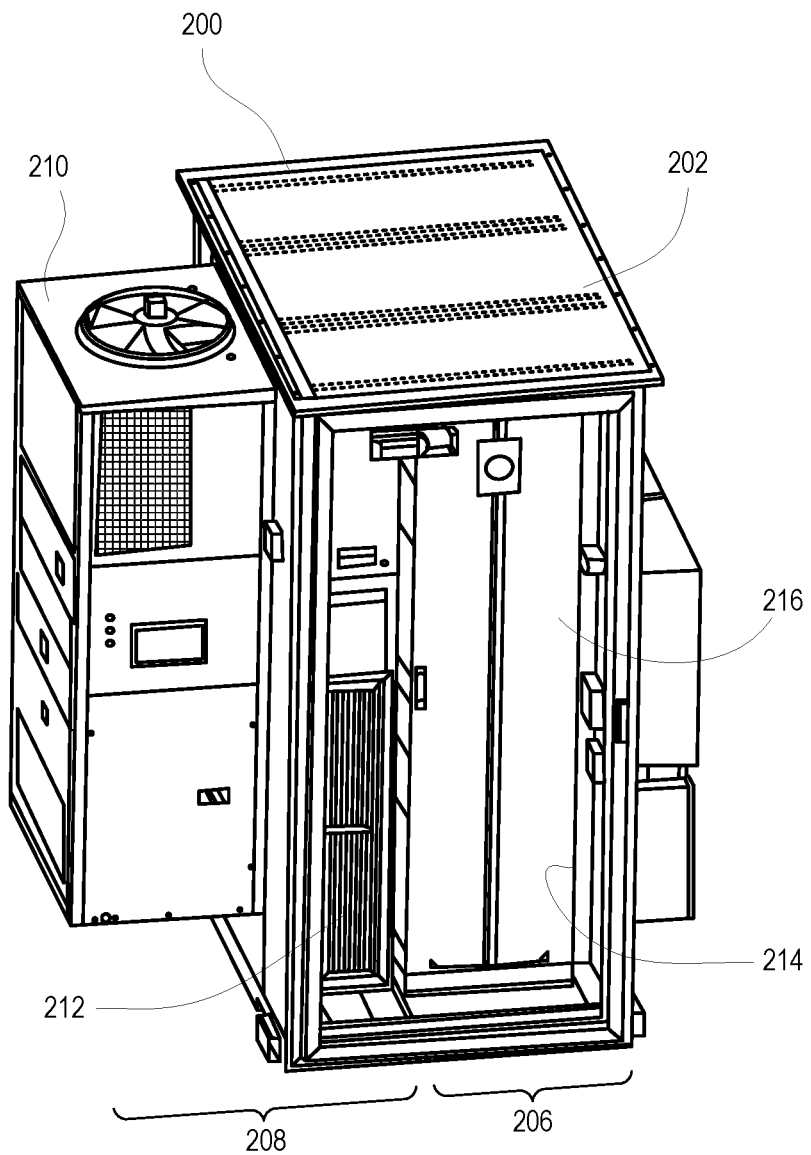
FIG. 4 is a top perspective view of the example MDC equipped with information technology (IT) and operation technology (OT) components, according to one or more embodiments.

FIG. 2 depicts a side perspective view of an example micro-MDC 200 that is palletized for delivery. Micro-MDC 200 can contain at least some of the same or similar functional components described for MDC 100 (FIG. 1). External enclosures 201*a-d* provide access respectively to controls, security, power, and network. Internal access of interior enclosure 202 (FIG. 4) is through door 204. FIG. 3 depicts a front view of the example MDC 200. FIG. 4 depicts a top perspective view of example MDC 200 with door 204 (FIG. 2) removed to expose IT components 206 and OT components 208. OT components 208 include air handling unit 210 that is externally mounted to enclosure 202. Air redirection structure 212 within volumetric container 203 directs cooling air through RIHS 216 of IT components 206. In one or more embodiments, MDC 200 is configured as micro MDC with one or two RIHS 216 for use as a modular edge data center (MEDC).

Figure 5A:
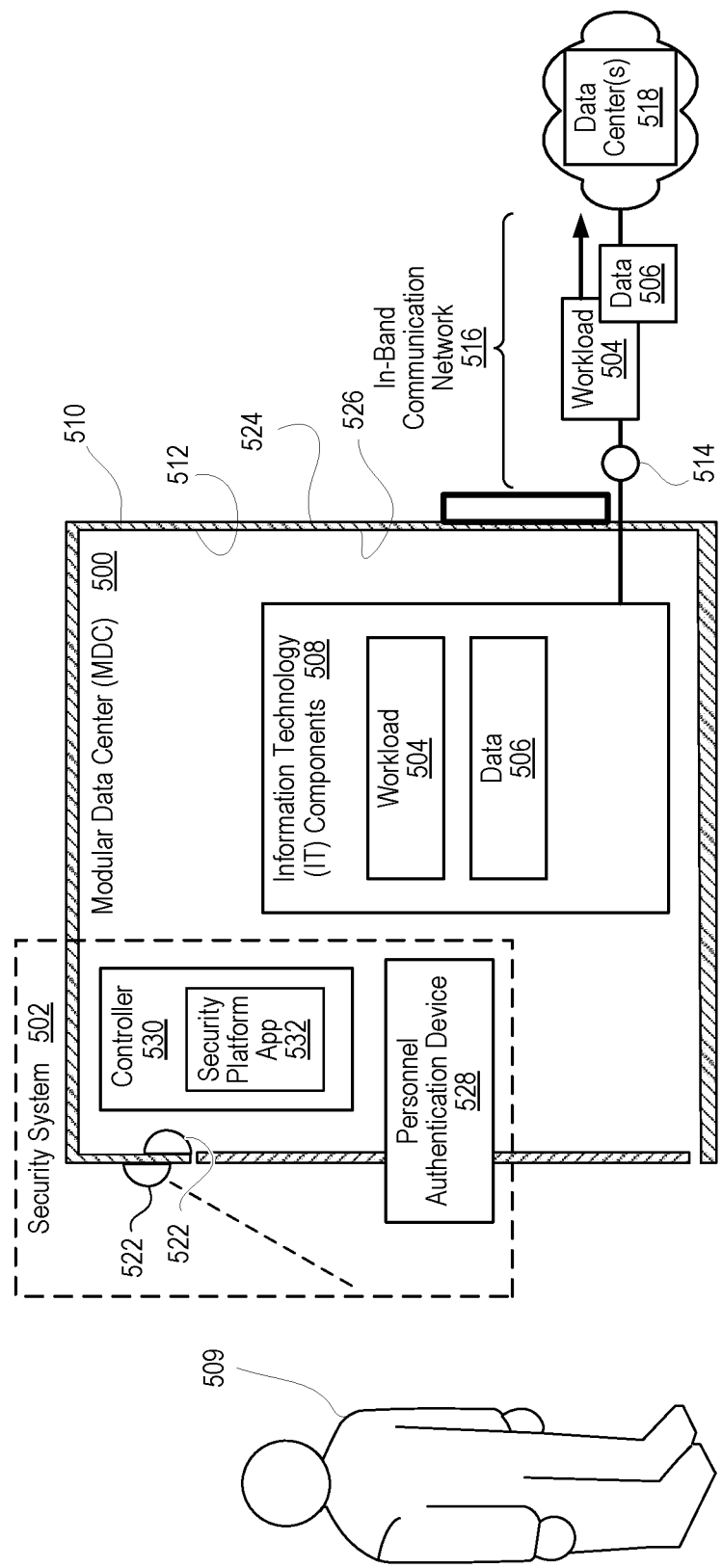
FIG. 5A is a simplified functional diagram of a security system of the MDC that transfers workload and data handled by the MDC in response to a detected physical threat, according to one or more embodiments.

FIG. 5A is a simplified functional diagram of MDC 500 having security system 502 that transfers workload 504 and data 506 handled by IT component(s) 508 of MDC 500 in response to a detected physical threat, such as person 509 that could be unauthorized. MDC 500 can be an implementation of MDC 100 (FIG. 1). Similarly named components are assumed to be the same as those presented in FIG. 1, and that use of different reference numerals are intended to simplify the description of the components relative to this isolated view. MDC 500 has an interior enclosure 510 of volumetric container 512 in which IT component(s) 508 is positioned. IT component(s) 508 has connection 514 to in-band communication network 516 that communicatively couples IT component(s) 508 and data center 518 external to MDC 500. Security system 502 includes sensor(s) 522 that detects a presence of person 509 in at least one of: (i) proximity to exterior 524 of volumetric container 512; and (ii) interior enclosure 510 of volumetric container 512. Personnel authentication device 528 receives authentication credentials to verify authorized personnel. Controller 530 is communicatively coupled to IT component(s) 508, connection 514 to in-band communication network 516, sensor(s) 522, and personnel authentication device 528.

Controller 530 executes security platform application 532 that enables MDC 500 to transfer workload 504 and data 506 in response to a detected physical threat. Controller 530 determines, based on sensor(s) 522, whether the presence of person 509 is detected. In response to determining that the presence of person 509 is detected, controller 530 determines, based on data received from personnel authentication device 528, whether the detected person 509 is authenticated. In response to determining that detected person 509 is not authenticated, controller 530 authenticates data center 518 via connection 514 to in-band communication network 516. MDC 500, via operation of controller 530 or IT component(s) 508, transfers workload 504 and data 506 handled by IT component(s) 508 to data center 518 via connection 514 to in-band communication network 516.

Figure 5B:
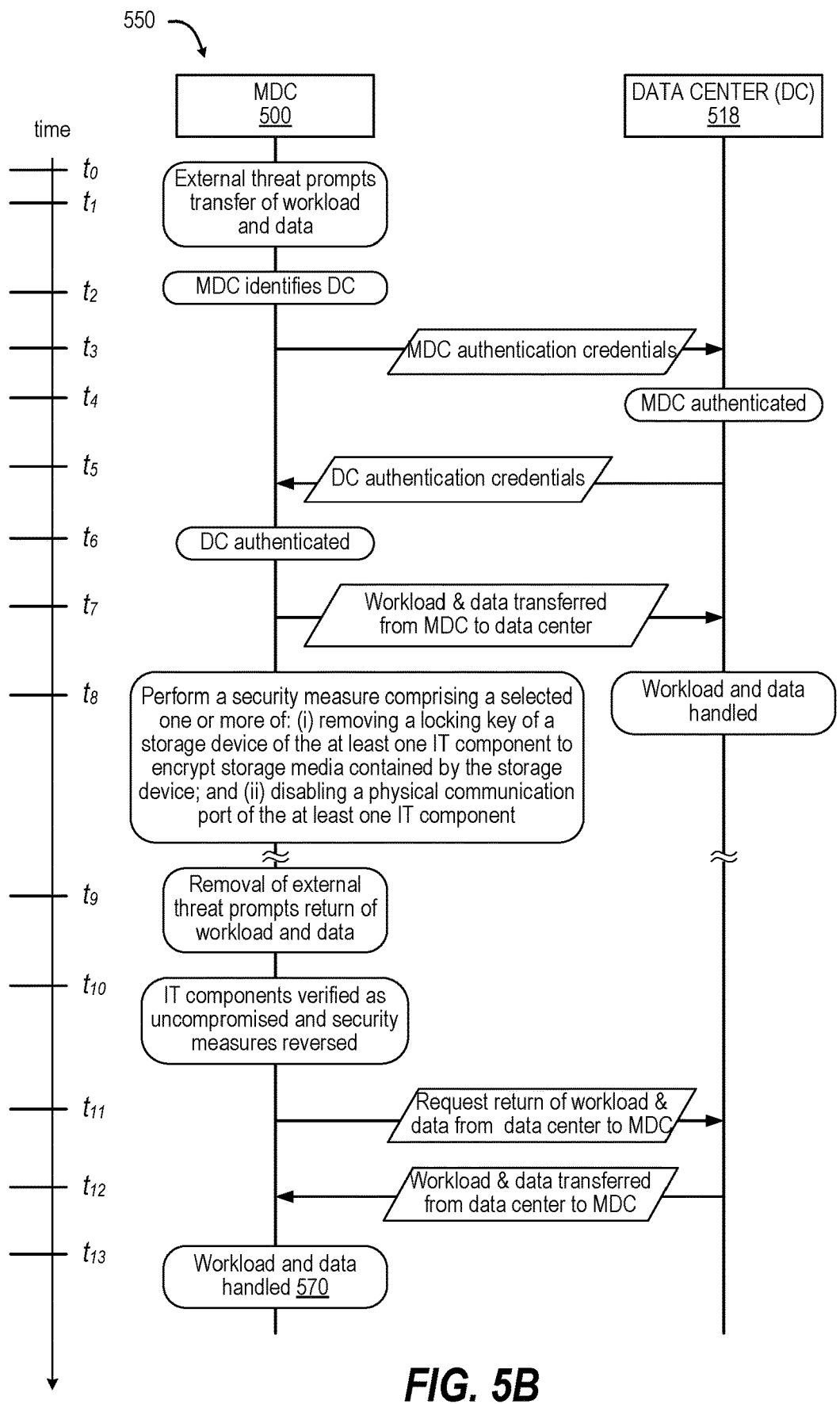
FIG. 5B is a timing diagram of interaction between the MDC and a data center, according to one or more embodiments.

FIG. 5B depicts a timing diagram 550 of interaction between MDC 500 and a data center 518. At time $t_1$, MDC 500 determines that an external threat prompts transfer of workload and data. At time $t_2$, MDC 500 identifies data center 518 as candidate to receive workload and data. In one or more embodiments, MDC 500 is provisioned with a list of one or more data centers to contact for transferring workload and data. In one or more embodiments, MDC 500 requests identity of a data center when needed from network operations center (NOC). In one or more embodiments, MDC 500 performs ad hoc discovery of an available data center that is connected to the in-band communication network. At time $t_3$, MDC 500 initiates exchange of authenticating credentials with data center 518. At time $t_4$, data center 518 authenticates MDC 500. At time $t_5$, data center 518 sends authenticating credentials to MDC 500. At time $t_6$, MDC 500 authenticates data center 518. At time $t_7$, MDC 500 transfers the workload and data to data center 518. At time $t_8$, data center 518 receives and stores the data and initiates handling of the workload. MDC 500 performs a security measure comprising a selected one or more of: (i) removing a locking key of a storage device of the at least one IT component to encrypt storage media contained by the storage device; and (ii) disabling a physical communication port of the at least one IT component. At a subsequent time $t_9$, MDC 500 determines that the external threat is removed, which would allow for return of workload and data. At time $t_{10}$, MDC 500 verifies that the IT components are not compromised by the external threat and reverses security measures. At time $t_{11}$, MDC 500 requests return of the workload and data from data center 518. At time $t_{12}$, data center 518 returns the workload and data to MDC 500. At time $t_{13}$, MDC 500 stores the data and resumes handling of the workload.

Figure 6A:
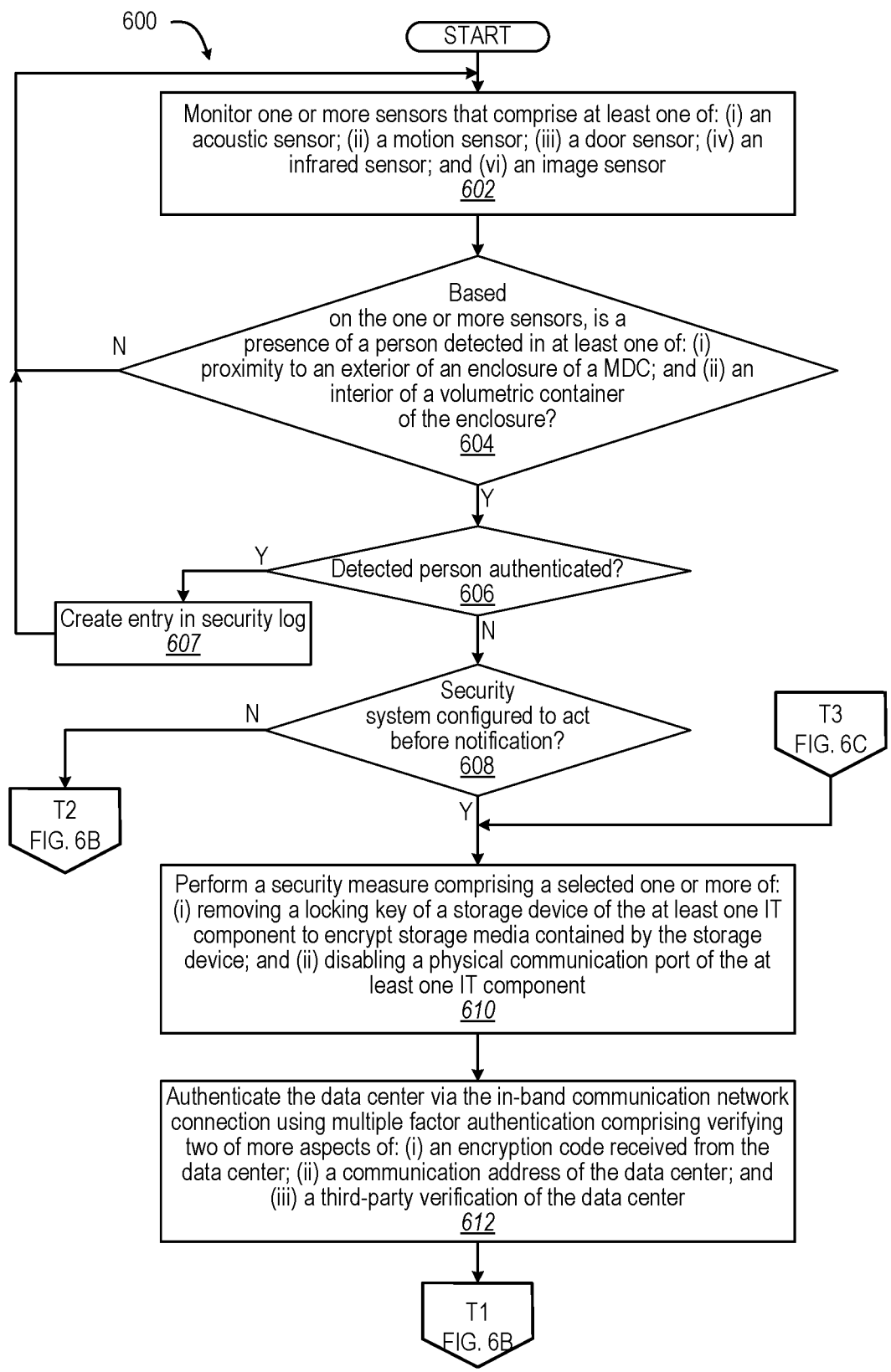
FIGS. 6A-C present a flow diagram of a method for autonomously securing workload and data handled by an MDC from an unauthorized, unauthenticated person, according to one or more embodiments.
Figure 6B:
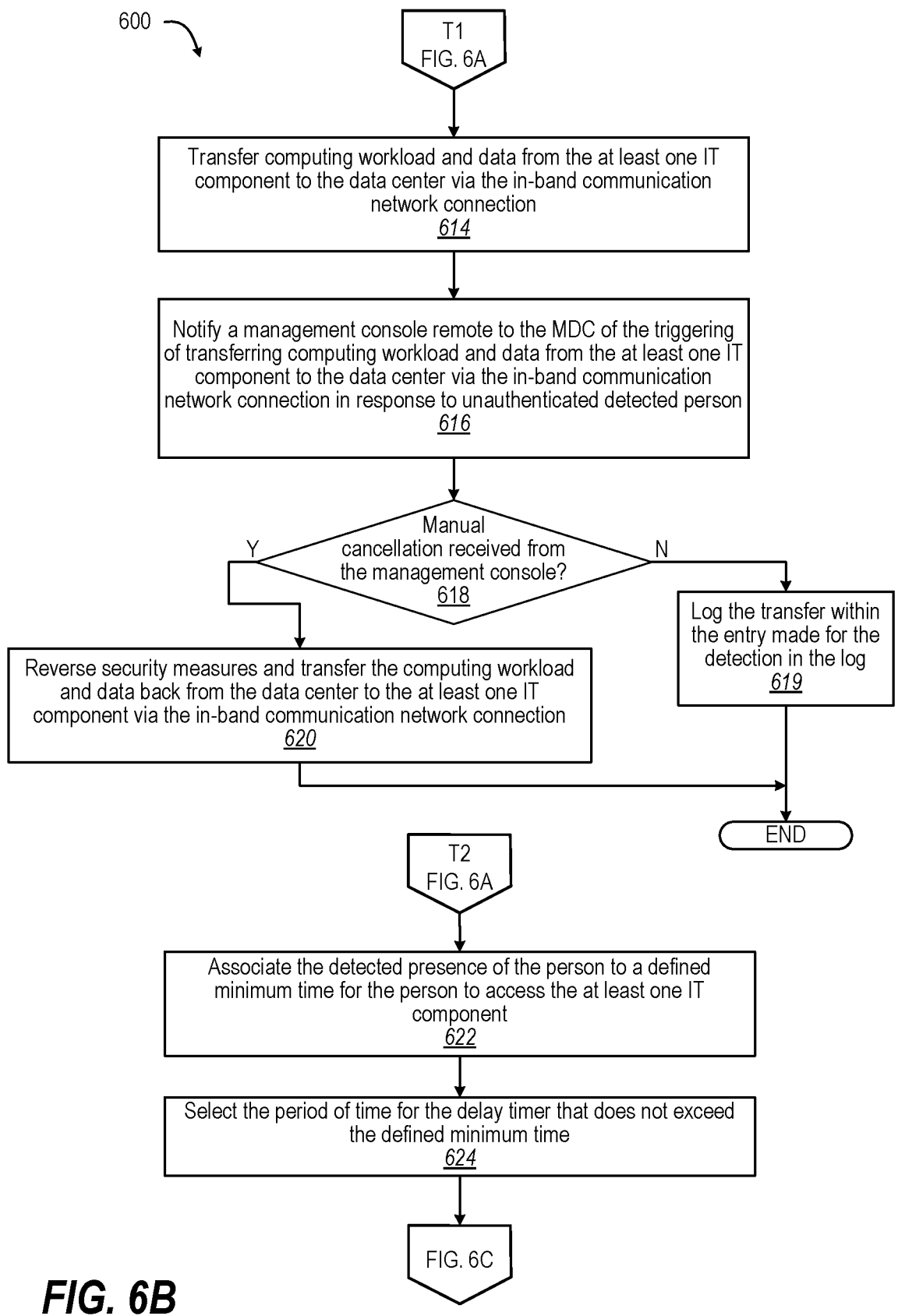
Figure 6C:
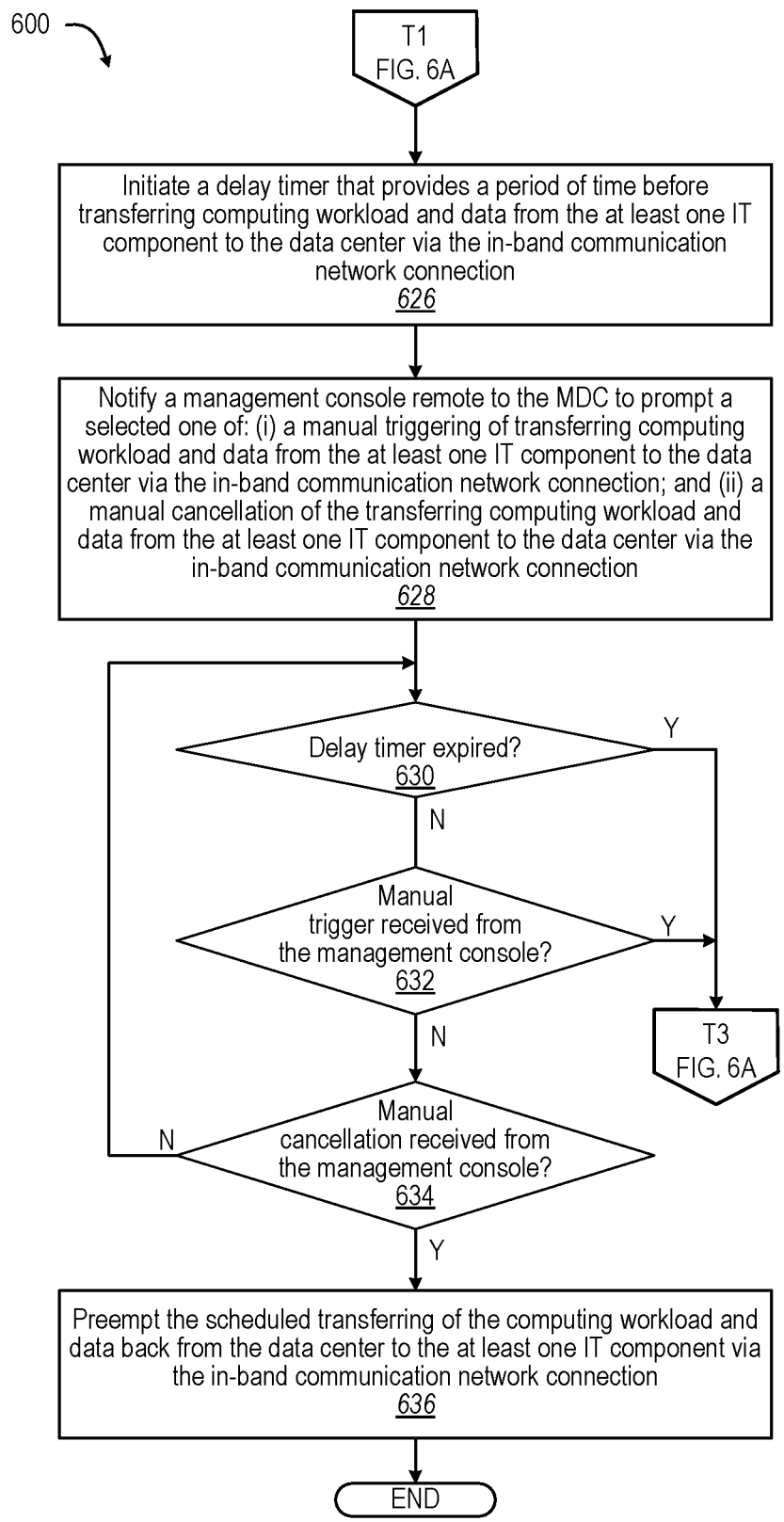

FIGS. 6A-C present flow diagrams of method 600 for securing workload and data handled by an MDC from an external unauthenticated person. OT controller 168 (FIG. 1) or controller 530 (FIG. 5A) respectively enable MDC 100 (FIG. 1) and MDC 500 (FIG. 5A) to perform method 600. With initial reference to FIG. 6A, method 600 includes monitoring one or more sensors (block 602). Controller determines in decision block 604, based on data sensed by and received from the one or more sensors, whether a presence of a person is detected in at least one of: (i) proximity to an exterior of a volumetric container of an MDC; and (ii) an interior enclosure of the volumetric container. The MDC includes at least one IT component positioned within the interior enclosure of the volumetric container.

In response to determining that the presence of a person is not detected, method 600 returns to block 602. In response to determining that the presence of a person is detected, controller determines in decision block 606, based on data received from a personnel authentication device, whether the detected person is authenticated. In response to determining that the detected person is authenticated, method 600 includes creating an entry in a security log (block 607). Then method 600 returns to block 602. In response to determining that the detected person is not authenticated, a determination is made, in decision block 608, whether the security system is configured to act autonomously to transfer workload and data before notification of a NOC or before receipt of a response from the NOC. In one or more embodiments, authentication occurs within an authentication period (i.e., before the authentication timer expires). Depending on the types of sensing and authentication, additional criteria can be required before a detected person is determined to be unauthenticated. For example, a person could be sensed external to MDC at a distance that is both not an imminent threat and is outside of the range of the personnel authentication device. Thus, a distance criterion could be required to allow for an authentication process to occur. For another example, an authentication process could require a certain amount of time to elapse, such as the time required for presenting a control card or entering a control code. Thus, a time interval criterion could be required to allow for an authentication process to occur. Conversely, sensing an intrusion inside the interior enclosure prior to authentication can trigger an immediate response. Other sensing and authentication technologies can enable an immediate determination. In response to determining that the security system is configured to act before notification, method 600 includes performing a security measure comprising a selected one or more of: (i) removing a locking key of a storage device of the at least one IT component to encrypt storage media contained by the storage device; and (ii) disabling a physical communication port of the at least one IT component (block 610). Method 600 includes authenticating the data center via the in-band communication network connection using multiple factor authentication comprising verifying two or more aspects of: (i) an encryption code received from the data center; (ii) a communication address of the data center; and (iii) a third-party verification of the data center (block 612). As an example of the third-party verification, a trusted management console can provide authentication keys directly to the MDC and the data center or provides network/IP addresses from one of the MDC and data center to the other.

Continuing with reference to FIG. 6B, method 600 includes transferring, by the controller or the IT component of the MDC, computing workload and data from the at least one IT component to the data center via the in-band communication network connection (block 614). Method 600 includes notifying a management console remote to the MDC of the transferring of the computing workload and data from the at least one IT component to the data center via the in-band communication network connection in response to an unauthenticated detected person (block 616). Controller determines, in decision block 618, whether a manual cancellation is received from the management console. In response to not receiving a manual cancellation from the management console, controller logs the transfer within the entry made for the detection in the log (block 619), and method 600 ends. In response to receiving a manual cancellation from the management console, method 600 includes reversing the security measures and transferring the computing workload and data from the data center back to the at least one IT component via the in-band communication network connection (block 620). Then method 600 ends.

In response to determining that the security system is not configured to act before notification in decision block 608 (FIG. 6A), method 600 includes associating the detected presence of the person to a defined minimum time for the person to access the at least one IT component (block 622). Method 600 includes selecting the period of time for the delay timer that does not exceed the defined minimum time (block 624). Continuing with reference to FIG. 6C, method 600 includes initiating a delay timer that provides the selected period of time before transferring computing workload and data from the at least one IT component to the data center via the in-band communication network connection (block 626). Method 600 includes notifying a management console remote to the MDC to prompt a selected one of: (i) a manual triggering of transferring computing workload and data from the at least one IT component to the data center via the in-band communication network connection; and (ii) a manual cancellation of transferring computing workload and data from the at least one IT component to the data center via the in-band communication network connection (block 628). A determination is made, in decision block 630, whether the delay timer has expired. In response to determining that the delay timer has expired, method 600 returns to block 610 (FIG. 6A). In response to determining that the delay timer has not expired, a determination is made, in decision block 632, whether a manual trigger of immediate transfer without delay is received from the management console. In response to receiving the manual trigger from the management console, method 600 returns to block 610 (FIG. 6A). In response to not receiving a manual trigger from the management console, controller determines, in decision block 634, whether a manual cancellation is received from the management console. In response to not receiving a manual cancellation from the management console, method 600 returns to decision block 630. In response to not receiving a manual cancellation from the management console, method 600 returns to block 630. In response to receiving a manual cancellation from the management console, method 600 includes preempting the scheduled transferring of the computing workload and data back from the data center to the at least one IT component via the in-band communication network connection (block 636). Then method 600 ends.

In the above described flow chart of FIGS. 6A-C one or more aspects of method 600 may be embodied in OT controller 168 (FIG. 1) or controller 530 (FIG. 5A) that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A modular data center (MDC) comprising:
a volumetric container having an interior enclosure;
at least one information technology (IT) component positioned within the volumetric container and comprising an in-band communication network connection communicatively coupled between the at least one IT component and a data center external to the MDC;
a security system comprising:
one or more sensors that detect a presence of a person in at least one of: (i) proximity to an exterior of the volumetric container; and (ii) the interior enclosure of the volumetric container;
a personnel authentication device that receives authentication credentials to verify authorized personnel; and
a controller communicatively coupled to the at least one IT component, the in-band communication network connection, the one or more sensors, and the personnel authentication device, the controller executing a security platform application that enables the MDC to:
determine, based on the one or more sensors, whether the presence of a person is detected; and
in response to determining that the presence of a person is detected:

determine, based on data received from the personnel authentication device, whether the detected person is authenticated; and in response to determining that the detected person is not authenticated: authenticate the data center via the in-band communication network connection; and transfer computing workload and data from the at least one IT component to the data center via the in-band communication network connection.

2. The MDC of claim 1, wherein:

the at least one IT component comprising a selected one or more of: (i) a storage device containing storage media; and (ii) a physical communication port; and in response to the determining that the detected person is not authenticated, the controller enables the MDC to secure the at least one IT component by performing a security measure comprising a selected one or more of: (i) removing a locking key of the storage device to encrypt the storage media; (ii) locking the in-band communication network connection; and (iii) disabling the physical communication port.

3. The MDC of claim 1, wherein the controller enables the MDC to authenticate the data center via the in-band communication network connection using multiple factor authentication comprising verifying two of more aspects of: (i) an encryption code received from the data center; (ii) a communication address of the data center; and (iii) a third-party verification of the data center.

4. The MDC of claim 1, wherein, in response to the transferring of the computing workload and the data from the at least one IT component to the data center, the controller enables the MDC to:

determine, based on the one or more sensors, whether the presence of the person is still detected; and transfer the computing workload and the data from the data center back to the at least one IT component via the in-band communication network connection in response to determining that the presence of the person is no longer detected.

5. The MDC of claim 1, wherein, in response to the transferring of the computing workload and the data from the at least one IT component to the data center, the controller enables the MDC to:

determine, based on the one or more sensors, whether the presence of any person is detected; and in response to determining that the presence of a person is detected:

determine, based on data received from the personnel authentication device, whether the detected person is authenticated; and transfer the computing workload and the data back from the data center to the at least one IT component via the in-band communication network connection in response to determining that the detected person is authenticated.

6. The MDC of claim 1, wherein, in response to the determining that the detected person is not authenticated, the security platform application triggers the MDC to perform a security measure by enabling the controller to:

initiate a delay timer that provides a period of time before autonomously transferring the computing workload and the data from the at least one IT component to the data center via the in-band communication network connection; and notify a management console remote to the MDC to prompt a selected one of: (i) a manual triggering of the transferring of the computing workload and the data from the at least one IT component to the data center via the in-band communication network connection; and (ii) a manual cancellation of the transferring of the computing workload and the data from the at least one IT component to the data center via the in-band communication network connection.

7. The MDC of claim 6, wherein the security platform application triggers the MDC to transfer the computing workload and the data from the at least one IT component to the data center via the in-band communication network connection by enabling the controller to:

associate the detected presence of the person to a defined minimum time for the person to access the at least one IT component; and select the period of time for the delay timer that does not exceed the defined minimum time.

8. The MDC of claim 1, wherein, in response to the determining that the detected person is not authenticated, the controller enables the MDC to:

notify a management console remote to the MDC of a pending transfer of the computing workload and the data from the at least one IT component to the data center via the in-band communication network connection; and in response to receiving a manual cancellation from the management console, transfer the computing workload and the data back from the data center to the at least one IT component via the in-band communication network connection.

9. A modular data center (MDC) security system comprising:

one or more sensors that detect a presence of a person in at least one of: (i) proximity to an exterior of a volumetric container of a MDC; and (ii) an interior enclosure of the volumetric container, the MDC comprising at least one information technology (IT) component positioned within the volumetric container and comprising an in-band communication network connection communicatively coupled between the at least one IT component and a data center external to the MDC;

a personnel authentication device that receives authentication credentials to verify authorized personnel; and a controller communicatively coupled to the at least one IT component, the in-band communication network connection, the one or more sensors, and the personnel authentication device, the controller executing a security platform application that enables the MDC to:

determine, based on the one or more sensors, whether the presence of a person is detected; and in response to determining that the presence of a person is detected:

determine, based on data received from the personnel authentication device, whether the detected person is authenticated; and in response to determining that the detected person is not authenticated:

authenticate the data center via the in-band communication network connection; and transfer computing workload and data from the at least one IT component to the data center via the in-band communication network connection.

10. The MDC security system of claim 9, wherein:

the at least one IT component comprising a selected one or more of: (i) a storage device containing storage media; and (ii) a physical communication port; and in response to the determining that the detected person is not authenticated, the controller enables the MDC to secure the at least one IT component by performing a security measure comprising a selected one or more of: (i) removing a locking key of the storage device to encrypt the storage media; (ii) locking the in-band communication network connection; and (iii) disabling the physical communication port.

11. The MDC security system of claim 9, wherein the controller enables the MDC to authenticate the data center via the in-band communication network connection using multiple factor authentication comprising verifying two of more aspects of: (i) an encryption code received from the data center; (ii) a communication address of the data center; and (iii) a third-party verification of the data center.

12. The MDC security system of claim 9, wherein, in response to the transferring of the computing workload and the data from the at least one IT component to the data center, the controller enables the MDC to:
determine, based on the one or more sensors, whether the presence of the person is still detected; and
transfer the computing workload and data from the data center back to the at least one IT component via the in-band communication network connection in response to determining that the presence of the person is no longer detected.

13. A method of autonomously securing workload and data handled by a modular data center (MDC) from an external unauthorized or unauthenticated person, the method comprising:
monitoring one or more sensors that detect a presence of a person in at least one of: (i) proximity to an exterior of a volumetric container of a MDC; and (ii) an interior enclosure of the volumetric container, the MDC comprising at least one information technology (IT) component positioned within the volumetric container and comprising an in-band communication network connection communicatively coupled between the at least one IT component and a data center external to the MDC;
determining, based on the one or more sensors, whether the presence of a person is detected; and
in response to determining that the presence of a person is detected:
determining, based on data received from a personnel authentication device that receives authentication credentials to verify authorized personnel, whether the detected person is authenticated; and
in response to determining that the detected person is not authenticated:
authenticating the data center via the in-band communication network connection; and
transferring computing workload and data from the at least one IT component to the data center via the in-band communication network connection.

14. The method of claim 13, further comprising, in response to the determining that the detected person is not authenticated, performing a security measure comprising a selected one or more of (i) removing a locking key of a storage device of the at least one IT component to encrypt storage media contained by the storage device; (ii) locking the in-band communication network connection of the at least one IT component to a data center that is remote to the MDC; and (iii) disabling a physical communication port of the at least one IT component.

15. The method of claim 13, further comprising authenticating the data center via the in-band communication network connection using multiple factor authentication comprising verifying two of more aspects of: (i) an encryption code received from the data center; (ii) a communication address of the data center; and (iii) a third-party verification of the data center.

16. The method of claim 13, further comprising, in response to the transferring of the computing workload and the data from the at least one IT component to the data center:
determining, based on the one or more sensors, whether the presence of the person is still detected; and
transferring the computing workload and the data from the data center back to the at least one IT component via the in-band communication network connection in response to determining that the presence of the person is no longer detected.

17. The method of claim 13, wherein, in response to the transferring of the computing workload and the data from the at least one IT component to the data center:
determining, based on the one or more sensors, whether the presence of any person is detected; and in response to determining that the presence of a person is detected:
determining, based on data received from the personnel authentication device, whether the detected person is authenticated; and
transferring the computing workload and the data back from the data center to the at least one IT component via the in-band communication network connection in response to determining that the detected person is authenticated.

18. The method of claim 13 prior to transferring the computing workload and the data from the at least one IT component to the data center, the method comprises:
initiating a delay timer that provides a period of time before autonomously transferring the computing workload and the data from the at least one IT component to the data center via the in-band communication network connection; and
notifying a management console remote to the MDC to prompt a selected one of: (i) a manual triggering of the transferring of the computing workload and the data from the at least one IT component to the data center via the in-band communication network connection; and (ii) a manual cancellation of the transferring of the computing workload and the data from the at least one IT component to the data center via the in-band communication network connection.

19. The method of claim 18, wherein the initiating of the delay timer comprises:
associating the detected presence of the person to a defined minimum time for the person to access the at least one IT component; and
selecting the period of time for the delay timer that does not exceed the defined minimum time.

20. The method of claim 13, further comprising, in response to the determining that the detected person is not authenticated:
notifying a management console remote to the MDC of the a pending transfer of the computing workload and the data from the at least one IT component to the data center via the in-band communication network connection; and in response to receiving a manual cancellation from the management console, transferring the computing workload and the data back from the data center to the at least one IT component via the in-band communication network connection.

\* \* \* \* \*